United States Patent [19]

Martin, Jr.

[11] Patent Number: 4,702,516
[45] Date of Patent: Oct. 27, 1987

[54] CAB CONSTRUCTION

[76] Inventor: Robert P. Martin, Jr., c/o Martin Sheet Metal, Inc. 7108 Madison Ave., Cleveland, Ohio 44107

[21] Appl. No.: 821,278

[22] Filed: Jan. 22, 1986

[51] Int. Cl.⁴ .......................... L02F 3/62; B62D 23/00
[52] U.S. Cl. .................................... 296/190; 296/187; 29/416; 29/428
[58] Field of Search ............... 296/187, 190, 200, 203, 296/205, 29, 30, 215; 52/455, 457; 29/416, 428

[56] References Cited

U.S. PATENT DOCUMENTS

| 4,055,262 | 10/1977 | Bauer et al. | 296/190 X |
| 4,079,985 | 3/1978 | Martin | 296/190 |
| 4,099,766 | 7/1978 | Lorenz | 296/215 |
| 4,119,340 | 10/1978 | Wolfe | 296/215 |
| 4,135,756 | 1/1979 | Hausmann | 296/190 |
| 4,546,585 | 10/1985 | Governale | 52/455 X |
| 4,611,452 | 9/1986 | Ralph | 52/455 |

FOREIGN PATENT DOCUMENTS 1043063  9/1983  U.S.S.R. ............... 296/190

Primary Examiner—Randolph Reese
Assistant Examiner—Russell D. Stormer
Attorney, Agent, or Firm—Pearman, Gordon, McCoy & Granger

[57] ABSTRACT

A construction for a cab face for a vehicle or the like in which a plurality of separate plates are assembled in a pattern that provides a rectangular window aperture and which allows substantially any cab face width to be formed from proper selection of plate sizes which vary incrementally.

3 Claims, 5 Drawing Figures

AVAILABLE ZONE/SIDE=
2"−(1/4"+ 5/8") = 1-1/8"

AVAILABLE ZONE/SIDE=
1-1/2"−(1/4"+ 5/8") = 5/8"

CAB CONSTRUCTION

BACKGROUND OF THE INVENTION

The invention relates to cabs for vehicles, and particularly to a construction for a cab having a generally planar face and a window aperture therein.

PRIOR ART

Industrial lift trucks, tractors, and like utility vehicles are frequently fitted with cabs that provide overhead protection for the operator against falling objects. When enclosed by doors or other panels, such cabs afford protection against adverse environmental conditions. A high degree of visibility from the cab is important for maneuvering the vehicle and its load. In the case of a lift truck, the cab roof panel conventionally has a window or skylight above and forward of the operator to provide a view of the forks when they are elevated. Typically, a lift truck cab is fabricated as a steel weldment using rectangular steel tubing in a perimeter framework and attaching steel panels to such framework to close off its various faces. The framework at the perimeter of the roof area provides crush resistance to falling objects, while the plate overlying the framework encloses the area bounded by the framework while affording maximum head room in the area above the operator.

In one conventional prior art method of forming a cab roof panel, a single sheet of ¼-inch steel plate is cut to cover substantially the full area of the roof. Subsequently, a window aperture is cut out of this sheet. This construction method has several disadvantages, which include high labor cost. A large sheet of ¼-inch stock, because of its bulk and weight, is difficult to handle at the shear station, aperture cutting station, and cab fabricating station, as well as to and from such stations.

Material costs are also relatively high with this construction technique because limited availability of large sheets of ¼-inch steel stock increases its price from suppliers and, often, much of the window cutout area cannot be used in fabricating other components, and must therefore be scrapped. Furthermore, the common practice of rounding the corners of the window adds fabrication costs because of labor to round the corners of the transparent windowpane. Additionally, scrap lengths of elastomeric weatherstripping used to mount the windowpane are produced when a continuous piece is used around a pane and the remnant of a supply roll of weatherstripping is too short to wrap continuously around a pane.

SUMMARY OF THE INVENTION

The invention provides a panel construction in which a plurality of individual plates are joined on a perimeter framework to cover the area bounded thereby and to form a window opening therein. The construction is particularly suited for the roof structure of a lift truck cab, where the framework and window aperture or skylight are typically rectangular. As disclosed, the roof covering comprises a set of three relatively narrow plates arranged in a U-shaped pattern to form three sides of the window aperture. A fourth, generally larger plate completes the main roof covering.

The pattern in which the narrow roof cover plates are arranged in accordance with the invention takes advantage of the geometry of the frame elements and allows substantially any cab roof width to be fabricated by a proper selection of these narrow plates from stock sizes. The stock sizes, according to principles of the invention, vary by dimensional increments that are related to the width of the side frame elements in the plane of the panel or face. More specifically, the side frame elements are of standard structural mill sizes, of for example 1½ inch or 2-inch widths at the plane of attachment with the plates. These face widths each provide a zone at which an edge of a cover plate is permitted to be lapped and welded without being too close to either the outboard or inboard edge of the frame element. In the disclosed embodiment, the outboard and inboard margins from which the cover plate edges are prohibited are assigned widths of ¼ and ⅝ inch, respectively. For a frame element with a 2-inch face width, the edge receiving zone is 1⅛ inch, the gap remaining between the ¼-inch and ⅝-inch margins. From the understanding that a cover plate edge can be anywhere in the described available zone or field, it follows that a cab of substantially any actual width measured from outside to outside can be fabricated by selecting side cover plates of appropriate width from stock width sizes if such sizes vary in increments of 1⅛ inch. Similarly, for a frame element with a 1½ inch face width, the available zone is ⅝ inch, assuming the same margins as before, and therefore stock widths of the side cover plates vary by increments of ⅝ inch.

The disclosed pattern of assembly of the elongated cover plates also reduces and simplifies the selection of size of a center or end cover plate, as well as a windowpane. In the disclosed system, only two sizes of these end cover plates and windowpanes are required to satisfy normal cab width ranges. Advantageously, the size difference between end plates and between windowpanes is selected with reference to the range of sizes of the side plates, so that the required number of side plates to be carried in inventory can be reduced.

The disclosed multipart panel construction yields a substantial reduction in manufacturing cost when compared to prior art constructions. Labor costs are reduced, since relatively small panels are handled more easily by personnel during fabrication of individual parts and the cab itself. The elongated side and end cover plates, as well as the windowpane, can be selected from the inventory stock. Parts in inventory have relatively little labor content because set-up time is spread over a relatively large number of pieces. Material costs are reduced because there is no cutout for the window aperture and, consequently, no potential scrap associated with this area. Since smaller plate parts are used, raw material costs are potentially reduced. The rectangular window aperture allows greater utilization of weather-stripping stock, since this material is mitred at the corners of the aperture, and any remnant from a supply roll is not greater than the small dimension of the window aperture. Labor associated with rounding the corners of the windowpane is limited.

DETAILED DESCRIPTION OF THE PREFERRED EMBODIMENT

Figure 1:
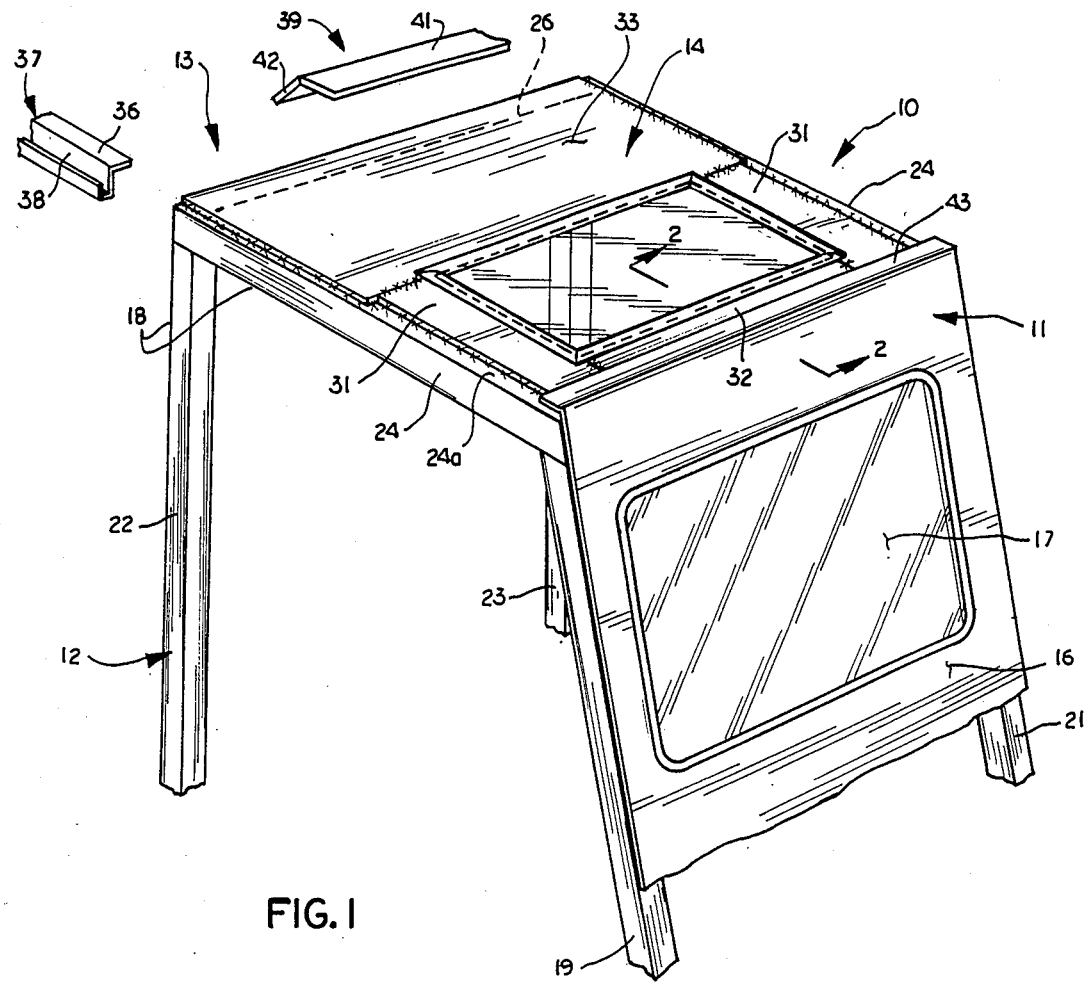
FIG. 1 is a fragmentary, perspective view of a lift truck cab assembly constructed in accordance with the present invention.

A cab 10 suitable for use on a lift truck, other utility vehicle, or like equipment or machinery is illustrated in the fragmentary view of FIG. 1. The cab 10 has a front face 11, side faces 12, rear face 13, and top or roof face 14. Although not shown for the sake of simplicity, the side faces 12 are ordinarily fitted with doors, and the rear face 13 is fitted with a fixed panel in a conventional manner to enclose the space within the ab. The front cab face 11 is closed by a sheet steel panel 16 having a windshield 17 of transparent safety glass or like suitable material.

The cab 10 is a weldment made up primarily of steel structural tubing which forms a perimeter framework 18 and steel plates which enclose the areas between the framework elements. In the illustrated cab 10, the framework 18 includes generally upright, rectangular steel tubing corner posts, two posts 19, 21 adjacent a front face of the cab and two posts 22, 23 adjacent a rear face. The upright posts 19-23 are interconnected by elongated, rectangular steel tubing headers 24, 25, and 26. As shown, the headers 24-26 are arranged in a rectangular array lying along the perimeter of the roof face 14 of the cab 10. The elongated header frame elements 24-26 each have upper horizontal faces 24a, 25a, and 26a coplanar with each other. These horizontal faces 24a-26a are substantially flat but for conventional corner radii at the intersection of their respective inner and outer vertical faces 24i, 24o; 25i, 25o.

The cab roof face 14 includes an assembly of separate steel cover plates 31-33 which overlie the headers 24-26 and close off the area which is bounded by these header elements. The cover plates include identical elongated side cover plates 31, an elongated front end or center cover plate 32, and a rear cover plate 33. An inward edge 31i, 32i, and 33i of each of these plates 31-33 forms a side of a rectangular window aperture 34. The three elongated plates 31,32 are arranged in a U-shaped manner, with the center plate 32 forming the bight of the U and being substantially fully straddled by the side plates 31. Thus, the ends 32e of the center plate 32, i.e., its edges running from front to rear of the cab, are each juxtaposed with an adjacent area of the inner longitudinal edges 31i of the side plates 31. The rear cover plate 33 in the illustrated case is relatively large in comparison to the other cover plates 31,32 and extends across the full width of the cab 10. Seams between the end edges 32e of the center cover plate 32 and the side plate edges 31i, and between the end edges 31e of the side plates 31 and the rear plate edge 33i are continuously seal-welded and may be caulked if desired. Outward edges 31o, 32o, and 33o of the cover plates 31-33 are lapped over and bead-welded on the subjacent upper faces 24a-26a of the header elements 24-26. Preferably, these outward cover edges 31o, 32o, and 33o are spaced inwardly of the outer edges of the header faces 24a, 25a so that associated weld beads are spaced from the corner radii of the associated headers, or at least do not project laterally beyond the outward vertical side faces 24o, 25o of these header elements. At the sides 12 of the cab 10, the weld beads along the edges 31o, 33o of the plates 31, 33 can be covered by a flange 36 of a steel J-strip 37. A fragmentary section of the J-strip 37 is illustrated in exploded relation to the cab in FIG. 1. In assembly, a vertical web 38 of the J-strip 37 abuts the side face 24o of each side header 24 and the flange 36 rests on and is welded to adjacent areas of the cover plates 31-33.

Figure 2:
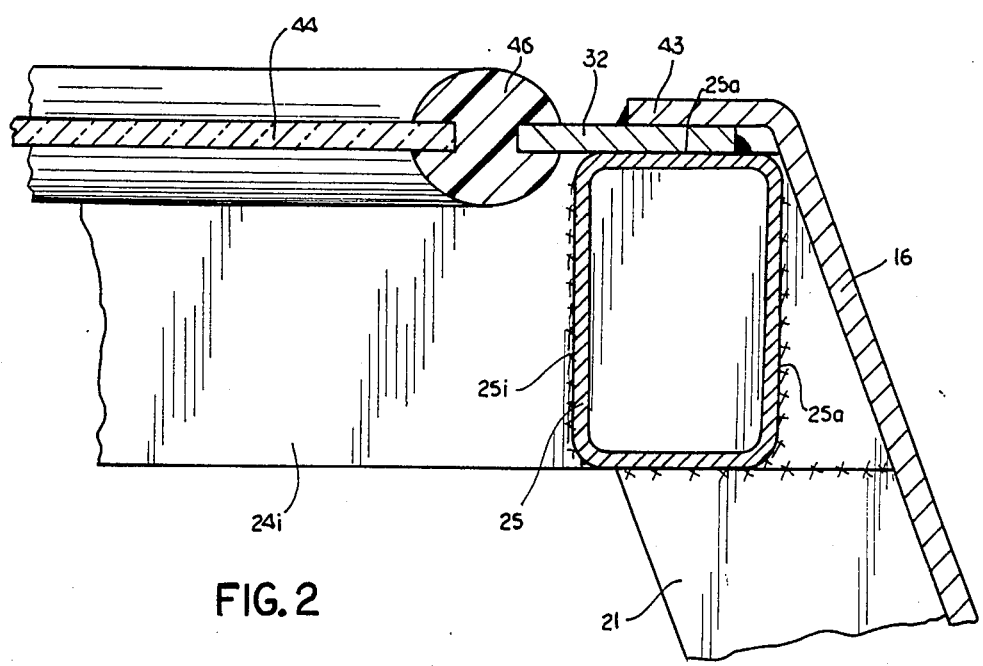
FIG. 2 is a fragmentary, sectional view of a portion of the roof structure of the cab of FIG. 1, taken across the plane indicated at the lines 2—2 in FIG. 1.

An overhang trim strip 39, shown as a fragment in exploded relation to the cab in FIG. 1, can be welded to the rear edge of the rear cover plate 33. In assembly, a horizontal flange 41 of the strip 39 overlies the rear cover plate 33 and a depending flange 42 is cantilevered to the rear. At the front of the cab 10, the steel sheet 16 forming the front panel (FIG. 2) can be broken over to form a trim flange 43 overlying adjacent edges 32o, 31e of the center cover plate 32 and side cover plates 31. A rectangular transparent windowpane 44 is mounted in the window aperture 34 by commercially available elastomeric weatherstrip material 46. The weatherstrip material 46 is provided in four individual lengths along the sides of the window aperture 34, and such lengths are mitred at the corners of the aperture and, ideally, are bonded together by a suitable sealant.

In accordance with this invention, various elongated cover plates 31, 32 may be precut and inventoried by the manufacturer of the cab prior to the time of main assembly of the cab. The plates 31, 32 can be precut at specified sizes that vary by multiples of certain dimensions which, as explained more fully below, are related to the size of the structural header frame elements 24. Importantly, virtually any size cab width within a nominal range of from 51½ inches to 34½ inches, for example, can be assembled by selecting the proper elongated plates from the inventoried stock.

Tables I through IV, set out below, specify stock sizes for the elongated cover plates.

TABLE I

| 2" HEADER Quantity | 32" HOLE Part No. | ROOF TOP PARTS Part Size/Inches | | CAB 0/0 AT TOP Max. Inches | Min. Inches |
|---|---|---|---|---|---|
| 1 | 12 | 2½ × 31 13/16 | Frt. Ctr. | | |
| 2 | 1 | 8⅜ × 17⅞ | Side | 51½ | 49¼ |
| 2 | 2 | 7¼ × 17⅞ | Side | 49¼ | 47 |
| 2 | 3 | 6⅛ × 17⅞ | Side | 47 | 44¾ |
| 2 | 4 | 5 × 17⅞ | Side | 44¾ | 42½ |
| 2 | 5 | 3⅞ × 17⅞ | Side | 42½ | 40¼ |
| 2 | 6 | 2¾ × 17⅞ | Side | 40¼ | 38 |
| | | Min. for 32" hole | | Smaller than 38" 0/0 use small skylight | |

TABLE II

| 1½" HEADER Quantity | | 32" HOLE Part No. | ROOF TOP PARTS Part Size/Inches | | CAB 0/0 AT TOP Max. Inches | Min. Inches |
|---|---|---|---|---|---|---|
| 1 | | 12 | 2½ × 31 13/16 | Frt. Ctr. | | |
| 2 | use | 1 | 8¼ × 17⅞ | Side | 50¾ | 49½ |
| 2 | | 7 | 7⅞ × 17⅞ | Side | 49½ | 48½ |
| 2 | | 2 | 7¼ × 17⅞ | Side | 48¼ | 47 |
| 2 | | 8 | 6⅛ × 17⅞ | Side | 47 | 45¾ |
| 2 | use | 3 | 6 × 17⅞ | Side | 45¾ | 44½ |
| 2 | | 9 | 5⅜ × 17⅞ | Side | 44½ | 43¼ |
| 2 | | 10 | 4¾ × 17⅞ | Side | 43¼ | 42 |
| 2 | | 11 | 4⅛ × 17⅞ | Side | 42 | 40¾ |

TABLE II-continued

| 1¼" HEADER | | 32" HOLE | | CAB 0/0 AT TOP | |
|---|---|---|---|---|---|
| Quantity | | Part No. | ROOF TOP PARTS Part Size/Inches | Max. Inches | Min. Inches |
| 2 | | 13 | 3½ × 17⅞ Side | 40¾ | 39½ |
| 2 | use | 6 | 2⅞ × 17⅞ Side | 39½ | 38¼ |
| 2 | | 14 | 2¼ × 17⅞ Side Min. for 32" hole | 38¼ Smaller than 37" 0/0 use small skylight | 37 |

TABLE III

| 1¼" HEADER | | 27⅞" HOLE | | CAB 0/0 AT TOP | |
|---|---|---|---|---|---|
| Quantity | | Part No. | ROOF TOP PARTS Part Size/Inches | Max. Inches | Min. Inches |
| 1 | | 17 | 2¼ × 27⅞ Frt. Ctr. | | |
| 2 | use | 5 | 3 13/16 × 17⅞ Side | 37 | 35¾ |
| 2 | | 15 | 3 3/16 × 17⅞ Side | 35¾ | 34½ |
| 2 | | 16 | 2 9/16 × 17⅞ Side Min. for 27⅞" hole | 34½ | 33¼ |

TABLE IV

| 2" HEADER | | 27⅞" HOLE | | CAB 0/0 AT TOP | |
|---|---|---|---|---|---|
| Quantity | | Part No. | ROOF TOP PARTS Part Size/Inches | Max. Inches | Min. Inches |
| 1 | | 17 | 2¼ × 27⅞ Frt. Ctr. | | |
| 2 | use | 5 | 3 11/16 × 17⅞ Side | 38 | 35¾ |
| 2 | use | 6 | 2 9/16 × 17⅞ Side Min. for 27⅞" hole | 35¾ | 33½ |

At the right of each Table I–IV are two columns which list maximum and minimum outside-to-outside (O/O) width dimensions (in inches) in successive rows. In the center of each row is listed the part size (in inches) for the cover plates 31, 32. Each Table has only one part size for the center cover plate 32, those for Tables I and II being the same, and those for Tables III and IV being the same.

Figure 3:
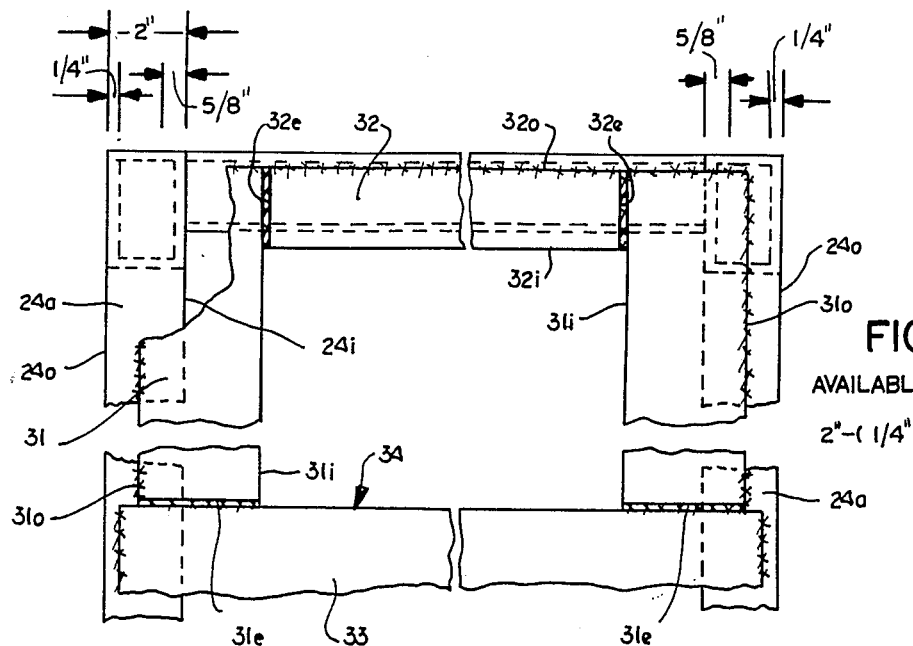
FIG. 3 is a diagrammatic view of a portion of a cab construction utilizing frame elements of a relatively wide face.
Figure 4:
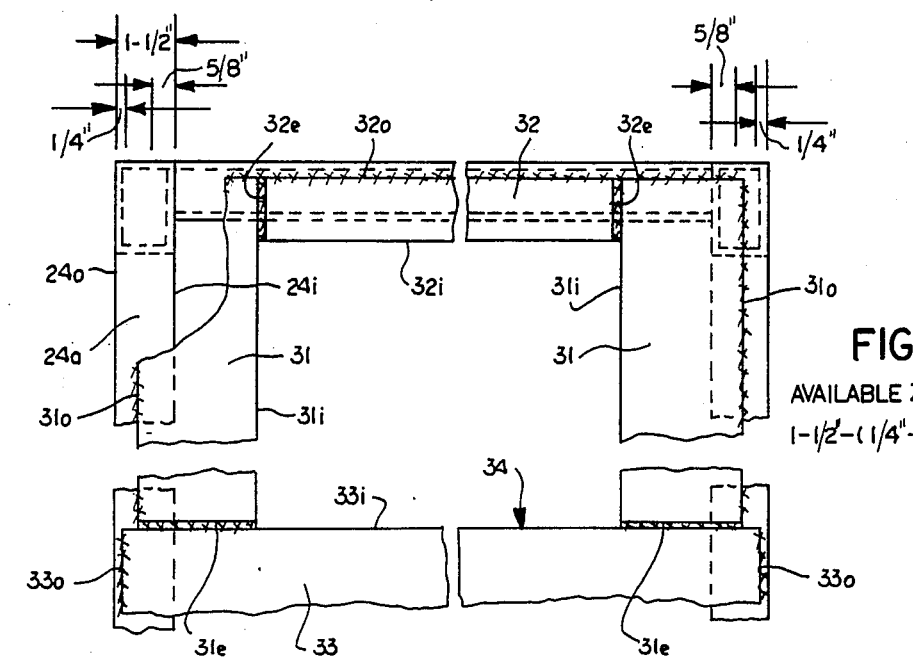
FIG. 4 is a diagrammatic view similar to FIG. 1, but with frame elements of a smaller face dimension.

FIG. 3 is a diagrammatic representation for explanation of Tables I and IV, and FIG. 4 is a diagrammatic representation for explanation of Tables II and III. In FIG. 3, the side frame header elements 24 are two inches wide and may represent, for example, 2-inch×2-inch, 2-inch×3-inch, or 2-inch×4-inch rectangular steel tubing. Based on the assumption that, for good fabrication technique, outer edges 31o of the side cover plates 31 should not be closer than ¼ inch to the outside edge of the upper face 24a and ⅝ inch to the inside edge 24i of such face, the "available zone" for receiving such edges is 2 inches minus (¼ inch plus ⅝ inch) or 1⅛ inch. A similar analysis, suggested in FIG. 4, for a 1½-inch face width on the side header elements 24 yields an "available zone" of ⅝ inch. It follows that in Tables I and IV for 2-inch face width side header elements 24, the width of the side cover plates 31, changes by 1⅛ inch increments, and for 1½ face width side header elements, the side cover plates 31 change by ⅝ inch increments.

Figure 5:
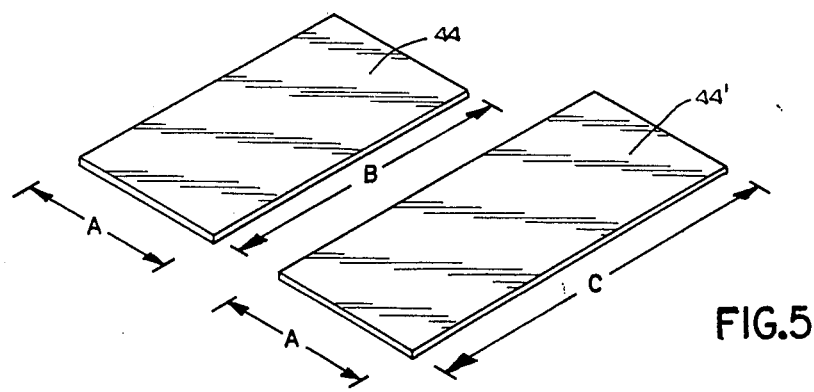
FIG. 5 is a perspective view of two windowpanes illustrated for comparative purposes.

When assembled for welding, the various cover plates 31–33 are spaced with gaps of, for example, 3/32 inch or ⅛ inch to receive a weld bead therebetween. The length of all the side cover plates 31 in Tables I through IV is the same. Only two different front center plates 32 are required in Tables I–IV, and these plates have the same width. With the length of the side plates 31 constant and the width of the center plates 32 constant, only two sizes of windowpanes 44 are required to fit the cab sizes listed in Tables I through IV. These window sizes are represented in FIG. 5, where the dimension A corresponds to the difference between the length of the side plate 31 and the width of the center plate 32 less a suitable clearance for the weatherstripping 46, and the dimensions B and C correspond to the two lengths of the front center cover plate 32 less suitable clearance for the weatherstripping. It will be seen that the difference in lengths between the front center plates 32 is approximately 4 inches. This difference is in the same order of magnitude as the difference between the major and minor widths of the side plates 31 (8⅜ inches to 2¼ inches) so that side cover plate parts specified in Tables I and II can be used in Tables III and IV.

Although the invention has been explained in connection with the English measure of inches, it is readily applicable in the metric system of measurement.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A cab for a vehicle or like equipment comprising a framework of elongated frame elements, including at least two frame elements adjacent opposed sides of the framework extending generally parallel to a first direction and having flat coplanar faces of predetermined substantially equal width, a set of four cover plates attached to the framework, the cover plates including three generally rectangular plates arranged in a U-shaped pattern with the plates forming the sides of the U each overlying one of the flat faces of the framework and extending along the opposite ends of the plate forming the bight of the U, the fourth cover plate extending between the flat faces of the framework and along the ends of the side plates remote from the end plate to close the U-shaped pattern into a rectangular window aperture, a rectangular transparent pane glazed on said window aperture, one dimension of said pane generally corresponding to the length of said bight plate and the other dimension generally corresponding to the length of the side plates less the width of said bight plate along which the side plates extend, the arrangement of the plates allowing a single size pane and a single size bight plate to be used on the cab regardless of its actual width by appropriate selection of the width of the side plates from fixed size increments.

2. A cab for a vehicle or like equipment as set forth in claim 1, wherein the edges of the side plates are disposed on the flat faces of the frame elements in a zone remote from both the inside and outside margins of such faces.

3. A cab for a vehicle or like equipment as set forth in claim 2, wherein said edges are lap-welded to said frame elements.

* * * * *